Patented Feb. 25, 1936

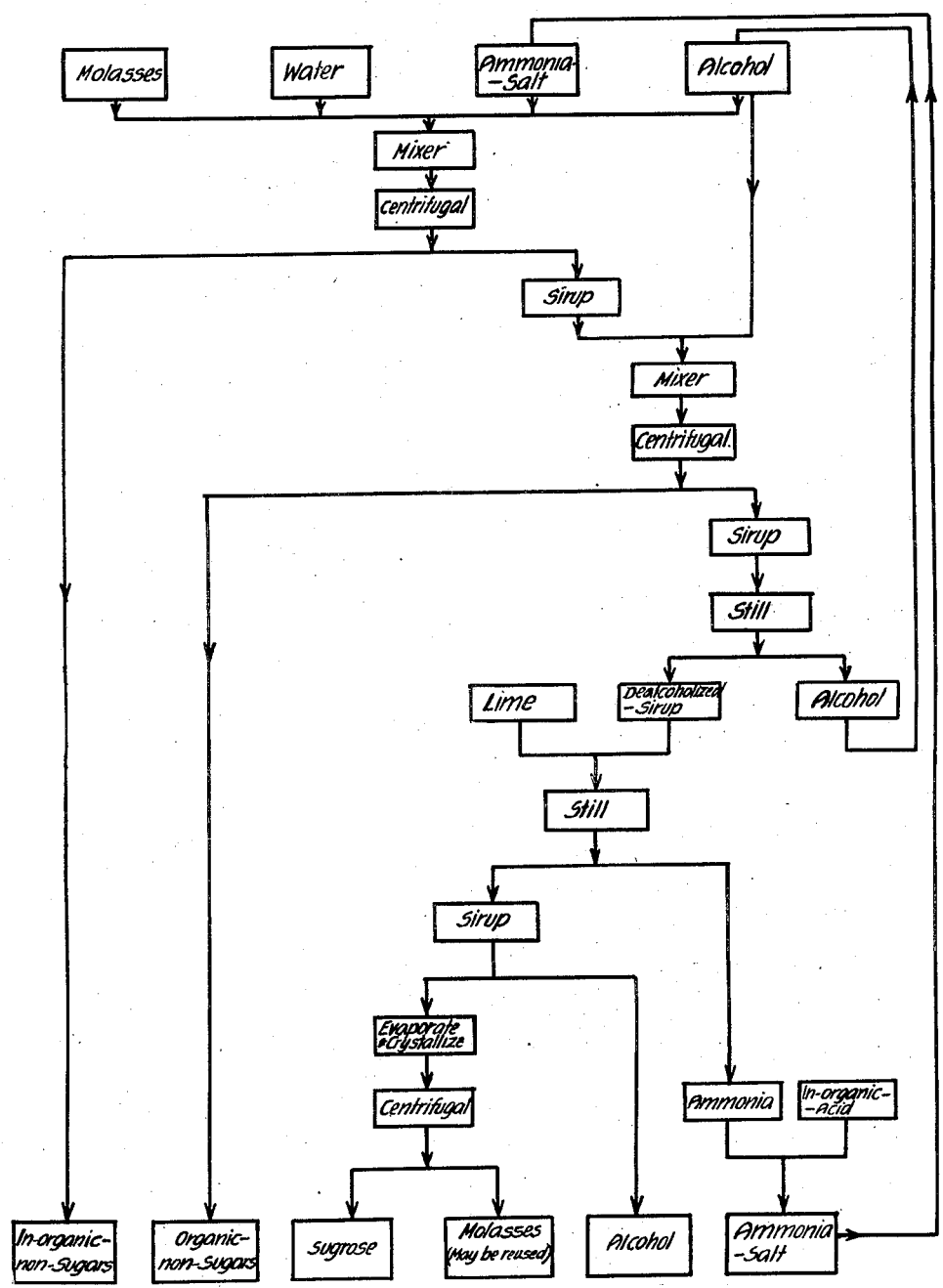

2,031,670

UNITED STATES PATENT OFFICE 2,031,670

ART OF RECOVERING NON-SUGARS FROM SACCHARINE MATERIALS

Gustave T. Reich, Philadelphia, Pa.

Application May 23, 1932, Serial No. 613,027

8 Claims. (Cl. 127—50)

In my patent application No. 606,993 filed Apr. 22, 1932, a process has been described whereby a large percentage of non-sugars are recovered by means of the use of ethyl alcohol as a precipitating agent. These non-sugars are organic and inorganic compounds, or a combination of both.

In the patent application No. 606,993 emphasis was placed upon the ratio of saccharine materials, water and ethyl alcohol. This ratio change is based upon the quality of saccharine material and percentage of non-sugars present. However, the precipitation of non-sugars, whether organic or inorganic, is quite selective, and therefore, in some instances, not remunerative.

A saccharine material such as molasses has been used for the production of ethyl alcohol and for the recovery of nitrogen and potash from the residue that is called slop. The nitrogen and potash have been recovered either by incineration (as it is practised at present) i. e. the ash contains the potash in the form of chloride, sulfate and carbonate, and the nitrogen, forming ammonia during the incineration is absorbed from the flue gases into sulfuric acid yielding ammonium sulfate.

Another way of recovering values from the slop or residual solution of the de-alcoholized fermented liquor is to distill it destructively, thus obtaining amines, ammonia, and various compounds while the residual solid matter contains the potash and carbon.

In every instance, the recovery of these non-sugars is quite expensive; so much so that their recovery is resorted to usually only when compulsory (such as for the prevention of pollution of rivers) and not as a matter of financial income.

In the present application, a process is described which does not follow the orthodox methods as practised for several decades. It is found that better yield and lower operative costs are involved if the inorganic and organic non-sugars from saccharine materials are recovered as per my process described in the following:—

Owing to the presence of organic compounds, upon incineration part of the potash is converted into carbonate, an alkali, which from a fertilizer standpoint is objectionable, as it is harmful and hence its market value is lowered. Among the potash for fertilizing purposes the sulfate phosphate also nitrate has a much greater value than the chloride and carbonate. This application aims for the recovery of the potash in more valuable form than could be obtained under regular processing: and the recovery of the non-sugars before and after fermentation. In the latter case, no inorganic salts are to be recovered, as the small amount present is not remunerative.

If saccharine materials containing organic and inorganic non-sugars, or both, are diluted to a certain point viz. to a point where the amounts of solids and liquid would be about equal, and treated with ethyl alcohol, a precipitate is obtained consisting mainly of non-sugars. However, the dilution will be such that sucrose and glucose remain in solution after the treatment with ethyl alcohol. It was found that the precipitation of inorganic salts was not complete, owing to their solubilities in dilute ethyl alcohol. Should we add a salt, preferably an ammonia salt, such as sulfate, nitrate or similar material, the inorganic salts are converted into compounds quite insoluble in ethyl alcohol such as potassium sulfate, calcium sulfate, potassium nitrate: thereby an almost complete precipitation of potash salts takes place.

My process has as its basis the application of the thought to avoid the primary precipitation of organic non-sugars and precipitate primarily only potash so far as possible and so far as possible in compounds suitable for commercial use and uncontaminated by organic non-sugars and by sugars. My process is intended primarily to secure the potash and, incidentally, if any lime should be present, preferably the lime separately and in compounds suitable for commercial use, and free from organic non-sugars, which latter are contaminants of the inorganic salts if mixed with them and, if secured separately, are often of very substantial value. It acts by utilizing the fact that, if alcohol is added only in quantities sufficient to keep the saccharine contents and the organic non-sugars in solution, leaving the ammonia to precipitate only the potash and lime (if any of the latter there be) and having the amount of the ammonia salt sufficient for this purpose, substantially the potash will be precipitated as an insoluble inorganic potash salt, and the organic non-sugars will be retained in solution. When the precipitated inorganic non-sugars have been removed from the solution, which contains the organic non-sugars in the dilute aqueous alcohol solution, the non-sugars can be precipitated and recovered by adding to the separated solution a quantity of alcohol sufficient to cause a precipitation of these organic non-sugars.

Another advantage of this step is that the saccharine solution, freed of a great part of the inorganic and organic non-sugars, can be concentrated, part of the sucrose recovered, and the new molasses thus formed containing but little of the non-sugars, especially of inorganic salts and can be used for the production of ethyl alcohol while the ammonia, after proper recovery is used over and over again as shown in the diagram.

As an example, I may take molasses called blackstrap, a saccharine material very high in organic and inorganic non-sugars, running from a content of non-sugars of from 25% to 45%. Molasses contains potash ($K_2O$) from 3-5 percent. If, for instance, to 1,000 gallons of molasses are added 500 gallons of water, also sufficient, say 40 to 100 lbs. of ammonium sulfate and afterwards 1,000 to 4,000 gallons of ethyl alcohol, we precipitate most of the potash as sulfate while the ammonia combines with the chlorine yielding ammonium chloride, the latter being quite soluble in alcohol. The precipitate formed may have a consistency from quite fluid to a tar like material and it contains potash as sulfate or nitrate, or as a similar potash compound quite insoluble in ethyl alcohol. The precipitation from the solution, from which the main portion of the phosphates had been removed of mainly organic non-sugars remaining in solution may be carried out in one or two steps depending upon the quality of the saccharine material. I may add first sufficient ethyl alcohol to precipitate any remaining inorganic salts, separate them by any conventional means such as centrifuging them, and then add sufficient ethyl alcohol to precipitate non-sugars low in inorganic salts. Each product can thereby be disposed of separately, thus getting a better price for same. This may be done after the separation of precipitate or precipitates, the supernatant liquid, consisting of ethyl alcohol sucrose, glucose, organic non-sugars and low percentage of inorganic non-sugars, mainly ammonia compounds, may first be freed of ethyl alcohol by distillation. Afterwards I may add sufficient lime (CaO) to drive off the ammonia. I may recover the ammonia either by absorbing it in water or what is better, in sulfuric acid, thus forming ammonium sulfate, which is capable of being used over again.

The ammonia free saccharine liquor low in its non-sugar content, can be concentrated, cooled in crystallizers and crystalline sucrose removed by conventional means such as centrifuge. The syrup coming from the crystals can be either treated for the recovery of more non-sugars or used for the manufacture of ethyl alcohol.

It is understood that the addition of lime (mentioned as added after distillation) is added mainly for the recovery of ammonia and to keep the pH of the syrup at a point where no destruction of the glucose will take place. If, for instance, a saccharine solution contains 70 parts glucose and three parts ammonia in sulfate form, we would add approximately five parts of lime to drive out ammonia.

For rapid understanding of the example given above my drawing shows diagrammatically the series of steps described in this particular example, the direction of movement of the treated material being indicated by the arrow.

Containers for molasses, water, ammonia and alcohol are arranged to be discharged into a mixer, which discharges into a centrifugal. The separated inorganic non-sugars are collected directly and the syrup proceeds to a mixer, where it is treated with additional alcohol, which precipitates the organic non-sugars leaving the syrup, which later can then be distilled and otherwise treated to save and/or utilizes any other product worth saving, specimens of which are shown in the flow sheet. However, these steps, while of substantial commercial value are not to be taken as part of process in such a way that it is limited to them. The identifying part of my process is the portion of it that ends with the separation of the organic non-sugars from the syrup from which had previously been recovered the inorganic salts, and indeed this recovery of organic sugars is not essential in all cases for cases may arise where they are of such small value as to be not worthy of recovery. The holding back of the organic non-sugar in an aqueous alcoholic solution while the inorganic salts, mainly the valuable potashes, are precipitated free from all contaminations is the distinguishing feature and which I intend to cover by my claims, which are not to be narrowed by the details of my specification.

Various steps in the process may be omitted with the omission of their functions, for instance, the various steps by which the alcohol and the ammonia salts are recovered and returned to the earlier stages of the process may either be omitted, and many changes may be made without departing from the spirit of my invention.

I claim:—

1. A process for the recovery of non-sugars from an aqueous solution of saccharine materials such as molasses, cane and beet juice and sucrose containing materials, and also certain soluble potash salts comprising adding to the solution, ammonium salt and ethyl alcohol, the alcohol and ammonium salts being proportioned relatively to each other and to the non-sugars so that the inorganic non-sugars will be precipitated by the ammonium salts, leaving the organic non-sugars mainly in solution until thereby a precipitation of potash salts occurs.

2. A process for the recovery of non-sugars from an aqueous solution of saccharine materials containing sucrose such as molasses, cane or beet juice or sucrose containing materials, that contain potash salts and organic non-sugars, comprising adding sufficient ethyl alcohol to hold the sucrose in solution and adding an ammonium salt to the solution until a precipitation of potash salts occurs.

3. In a process for the selective recovery of non-sugars from an aqueous solution of saccharine materials belonging to a group consisting of molasses, cane or beet juice, and sucrose containing materials that contain sucrose and organic and inorganic non-sugars including potash, the step of adding to this solution ethyl alcohol and an ammonium salt, the alcohol and the ammonium salts being proportioned relatively to each other and to the organic non-sugars that the inorganic non-sugars mainly will be precipitated and the organic non-sugars mainly be retained in the solution in sufficient quantity to precipitate the potash but in insufficient quantity to precipitate the sucrose.

4. The process as defined in claim 2 wherein the extent of the dilution of the ethyl alcohol and also the extent of the dilution of the ammonium salt is sufficient to precipitate mainly the inorganic salts, but is not carried to the extent as to precipitate other constituents of the solution.

5. A process for the recovery of non-sugars from an aqueous solution of saccharine materials belonging to a group consisting of molasses, cane or beet juice and sucrose containing materials which contain potash, in water soluble form, comprising adding to the solution an ammonium salt and ethyl alcohol, the alcohol and ammonium salts being proportioned relatively to each other and to the non-sugars so that the inorganic non-sugars will be precipitated by the ammonium salts, leaving the organic non-sugars mainly in solution until the potash is precipitated as a less soluble potassium compound and then separating it from the solution.

6. The process defined in claim 5 wherein the extent of the dilution of the ethyl alcohol and the ammonium salt is so regulated that mainly the inorganic salts are precipitated.

7. A process of recovering non-sugars from an aqueous solution of saccharine materials consisting of molasses, comprising adding sufficient alcohol and ammonium salts, the alcohol and the ammonium salts being proportioned relatively to each other and to the organic non-sugars that the inorganic non-sugars mainly will be precipitated and the organic non-sugars mainly be retained in the solution until there is formed a solution containing sucrose and organic non-sugars and a precipitate comprising potash salts, separating the latter from the solution, then adding to the solution remaining an additional quantity of alcohol, sufficient to precipitate the organic non-sugars.

8. The steps set forth in claim 7 wherein the non-sugars precipitated by the additional amount of alcohol are precipitated as viscous material.

GUSTAVE T. REICH.